United States Patent [19]
Franklin

[11] 3,866,464
[45] Feb. 18, 1975

[54] HYDRAULIC LOAD INDICATOR

[76] Inventor: Samuel H. Franklin, Box 45181, Tulsa, Okla. 74145

[22] Filed: Sept. 4, 1973

[21] Appl. No.: 393,933

[52] U.S. Cl. ................ 73/141 R, 177/147, 177/208
[51] Int. Cl. ............................................. G01l 1/02
[58] Field of Search ............ 73/141 R; 177/208, 147

[56] References Cited
UNITED STATES PATENTS

| | | | |
|---|---|---|---|
| 1,023,154 | 4/1912 | Kenerson | 73/141 R X |
| 1,479,581 | 1/1924 | Berry | 177/208 X |
| 2,986,938 | 6/1961 | Grandstaff | 73/392 |
| 3,178,937 | 4/1965 | Bradley | 73/141 R |
| 3,285,070 | 11/1966 | McDonough | 73/141 R X |

FOREIGN PATENTS OR APPLICATIONS

| | | | |
|---|---|---|---|
| 1,171,105 | 11/1969 | Great Britain | 177/208 |
| 435,623 | 10/1967 | Switzerland | 73/141 R |

*Primary Examiner*—Charles A. Ruehl
*Attorney, Agent, or Firm*—Head & Johnson

[57] ABSTRACT

This disclosure describes a hydraulic type load indicator for the measurement of large tensile forces. It comprises a load cell which is made up of two flat metal parts held together by screws. At the interface between the two parts is a flat neoprene circular diaphragm with molded circumferential "O" ring, a circular piston fits into a corresponding opening in the top plate and pressed on the diaphragm. There is a circular cavity under the diaphragm which is filled with liquid. Pressure on the piston causes downward movement of the diaphragm and compression of the liquid. The compression in the liquid is measured by a conventional Bourdon indicator element. A hook is attached to a yoke which slips over the two plates and pressed on the piston by means of a ball seated in a cavity in the center of the top of the piston.

The principle novelty of this invention lies in the design of the diaphragm so as to provide linear readings of the pressure gauge with force supplied to the piston, and in the design of the system so that a very minimum volume of liquid can be used and thereby minimize the effect of temperature on the gauge reading due to the temperature expansion coefficient of the liquid. Another important feature includes the simplicity of the design, construction, and the assembly of the instrument.

6 Claims, 7 Drawing Figures

HYDRAULIC LOAD INDICATOR

BACKGROUND OF THE INVENTION

This invention lies in the field of force measuring and indicating devices. Still more particularly, it is in the field of tensile force measuring devices of the hydraulic type in which the force to be measured is transmitted by a piston through a diaphragm to a confined liquid and the compressive force in the liquid is indicated by a Bourdon type pressure element.

In the prior art there are a number of examples of hydraulic load cells of the general construction of this device; however, because of inferior design they are subject to errors which are avoided by the particular design of this invention. For example, some of these have inside separation between the load cell and the Bourdon element, which because of the large volume of liquid and elasticity of the tubular connection involve large piston travel, with corresponding variation in the area of contact between the piston and the diaphragm. Also, the large volume of liquid subject to thermal expansion causes a corresponding change in area of contact of the piston.

SUMMARY OF THE INVENTION

It is a primary object of this invention to provide an improved hydraulic load indicator in which the hydraulic fluid is of absolute minimum volume, in which the fluid is confined by means of a flat circular diaphragm with circumferential "O" ring molded as part of the diaphragm, and in which the force is applied through a ball and socket connection to a piston which is adapted to press on the diaphragm and through the diaphragm to compress the liquid.

The indicator of the compression in the liquid is a Bourdon type pressure gauge of conventional design, that is mounted in very close proximity to the load cell, so that there is a minimum of volume of liquid between the diaphragm and the Bourdon tube.

Another feature is the use of a selected flow restriction in the liquid path between the reservoir and the Bourdon tube. This utilizes a small diameter set screw which is inserted into a threaded portion of the liquid conduit, one side of one end of the screw is removed to leave one or more complete turns of thread. When this modified set screw is threaded into the opening there will be a very small clearance between the remaining threads on the screw and the threads in the conduit which serve as a constriction on the flow of liquid and provide a low pass, high out filtering action which makes the gauge insensitive to sudden shock forces.

BRIEF DESCRIPTION OF THE DRAWINGS

These and other objects of this invention and a better understanding of the principles and the details of the invention will be evident from the following description taken in conjunction with the appended drawings in which.

DESCRIPTION OF THE PREFERRED EMBODIMENT

Figure 1:
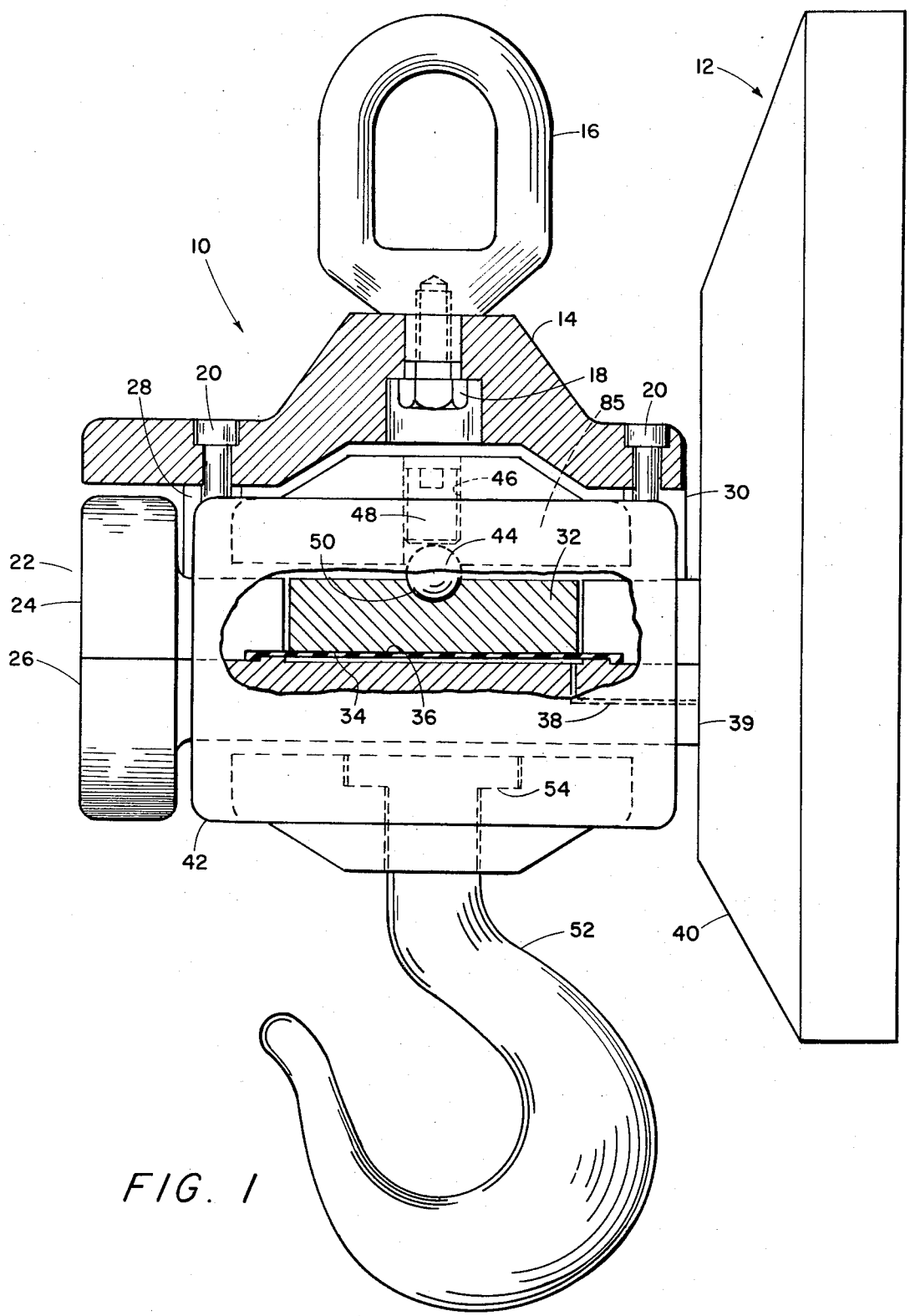
FIG. 1 shows, in partial section, an overall view of the hydraulic load indicator.

Referring now to the drawings, there is shown in FIG. 1 a general view of the instrument, which has two principle parts; the load cell indicated generally by the numeral 10 and the indicator shown generally by the numeral 12.

The force sensing portion of the device is confined to two plates of metal 24 and 26 which are accurately machined to fit together and seal the space between them. As will be shown and described in detail in FIG. 3, there is a space machined for a flat circular diaphragm 34 and for sealing the peripheral edges of the diaphragm. The upper plate 24 has a circular opening into which is fitted, with minimum clearance, a circular piston 32. which rests on the diaphragm 34. There is a shallow circular cavity 36 machined out of the bottom plate 26 which is filled with oil. This cavity, or reservoir, 36 is connected by a small diameter conduit 38 to one end 39 of the plate 26.

Attached to the end 39 of the plates 26 and 24 by means of screws, not shown, is a circular housing 40 inside of which is positioned a Bourdon tube pressure measuring element with a pointer shaft, pointer and circular scale, all of this being substantially conventional.

Figure 2:
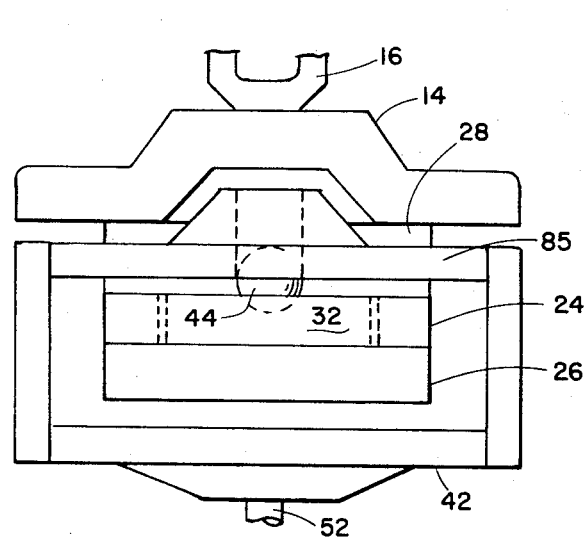
FIG. 2 shows a partial view of the load cell taken at right angles to that of FIG. 1.

The two plates 24 and 26 are screwed securely together and a top plate 14 is attached to the plates 24 and 26 by means of screws 20 and spacing blocks 28 and 30. An eye-bolt 16 is held in the top of the plate 14 by means of bolt 18, or in some similar manner. As shown also in FIG. 2, the hook 52 is swiveled at 54 in the bottom well of a rectangular yoke 42. The yoke 42 includes an upper horizontal portion 85 which fits freely over the two plates 24 and 26. There is a drilled and threaded opening 46 in the top well of the yoke which holds a spherical ball 44 by means of a threaded screw 48. The ball 44 fits into a spherical depression 50 in the center of the top of the circular piston 32. Consequently, when a tensile force is applied to the hook 52, the yoke 42 is pulled downward and communicates to the piston 32 through the spherical ball 44, the force which is applied to the hook.

Figure 6:
FIG. 6 is a detail of the construction of the diaphragm.
Figure 3A:
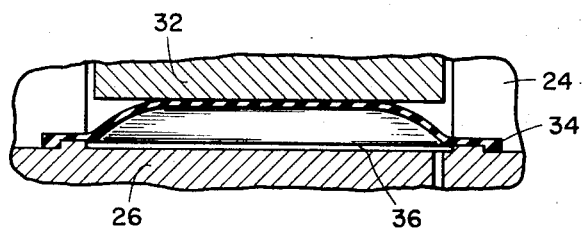
FIG. 3A indicates a possible condition of improper diaphragm contact with the piston.
Figure 3:
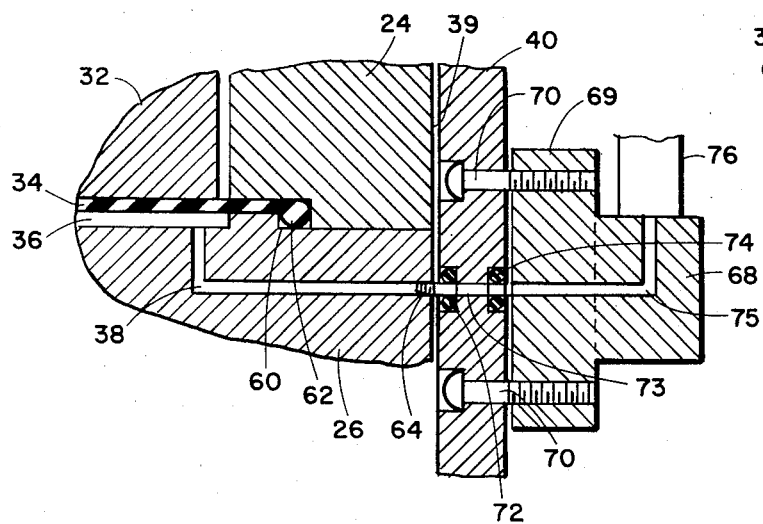
FIG. 3 shows a detail of the piston-diaphragm-reservoir and sealing means and the conduit leading to the Bourdon tube.

FIG. 3 shows an enlarged view in cross section of a portion of the piston 32, the diaphragm 34, and the cavity or reservoir 36. The diaphragm has an "O" ring 62, molded onto the circumferential edge, as shown in FIG. 6. This molded "O" ring fits into a machined cavity 60, and serves to seal the pressure of the liquid in the reservoir 36. The conduit 38 communicates between the reservoir 36, through the conduit 73 in the housing 40, through a corresponding conduit 75 leading to the Bourdon tube 76. By making the housing 40 of the gauge case thin, and mounting the Bourdon tube 76 in close proximity to the housing 40, and to the short conduit 38, there is an absolute minimum volume of liquid contained in the pressure sensing and indicating system.

In the prior art it is well known that when there is excessive motion of the piston, due for example to expansion of the liquid below the piston, as shown in FIG. 3A, the the diaphragm will be lifted. Since the diaphragm is of substantial thickness, it will be partially arched and therefore the contact between the liquid below the diaphragm and the piston will be over an area which is slightly less than the actual area of the piston, which is in contact with the diaphragm, when in the condition shown in FIG. 3. This possible change in contact area which is caused by expansion in the liquid is avoided in this device by making the liquid volume so small, that even though the liquid has some thermal expansion, the resulting change in volume, due to the temperature change, will be insignificant so far as changing the effective area of the piston is concerned.

The depth of the cavity 36 is of the order of 0.010 to 0.015 inch and the total motion of the piston going from no load to full load is of the order of a 0.002 to 0.005 inch.

Figure 4:
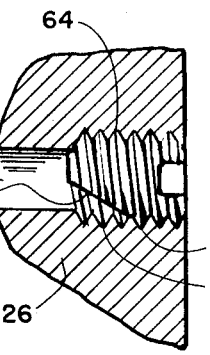
FIG. 4 is a detail of the constriction in the liquid flow channel.

In FIG. 3 the numeral 64 indicates the restriction, or constriction, in the conduit 38 so as to avoid large sudden movements of liquid through the conduit on the application of shock force loads. This is shown in greater detail in FIG. 4 where the conduit 38 is shown as being tapped out to provide threads 63. A short setscrew 64 is prepared by grinding off a corner 65, of selected size, so that when the set screw 64 is tightened into the threads 63, there will be a selected number of complete threads 67 remaining. It is the very small clearance between the tapped hole and the screw, over the several threads 67, which provide a tortuous path of small cross section for the liquid flow. This adds a short time constant to the indication of force, but it prevents the application to the Bourdon tube a very sharp, short-time, pulses of force and liquid pressure.

The conduit 73 in the housing 40 of the housing is provided with shallow counter bores on each surface of the housing 40, into which are fitted O-rings 72 and 74, of such diameter that when the housing 40 is pressed against the end 39 of the plate 26 there will be no leakage out of the conduits 38, 73, or 75. Thus, the connection between the reservoir 36 and the Bourdon tube 76 will be completely sealed, and will be of minimum volume so as to minimize the temperature effect due to the variation in density of the oil with temperature.

Figure 5:
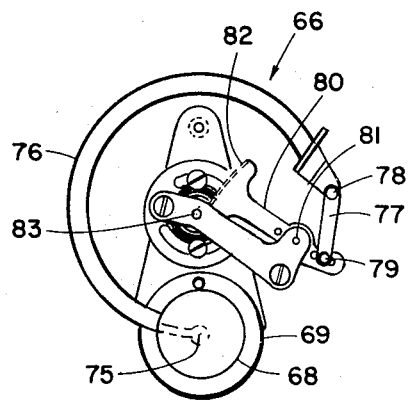
FIG. 5 is a view of the Bourdon tube assembly.

Referring to FIG. 5 the Bourdon tube indicated generally by the numeral 66 is standard in every respect except that it is mounted to the back plate as shown. The Bourdon tube 76 is attached to a cylindrical hub 68 with flange 69, which is attached to the back plate by means of screws 70, as shown in FIG. 3. Because of the minimization of liquid volume there has been found to be no need for temperature compensation of the oil by means of changes applied to the conventional Bourdon tube linkage system. This is shown as a link 77 attached to the end of the Bourdon tube by pin 78 and attached in a sliding hinged manner, at point 79, to the arm 80, which rotates about a pivot point 81. The arm 80 has a gear sector 82 cut on its circumferential surface which meshes with a small pinion, not shown, which is mounted on the pointer shaft 83. This shaft supports a long pointer which, as it rotates, indicates the angle of rotation, or corresponding graduations of pressure. The operations of adjusting the Bourdon tube, pointer, and scale is conventional in every respect and need not be discussed further at this time.

The liquid used in the hydraulic portion is a rather heavy oil, such as weight 40 motor oil, of good chemical antirust character. This heavy oil makes quite simple to fill the cavities in the various plates 26, 40 and 68 and assemble the three parts together in such a way that there is no loss of liquid and no entry of air into the liquid space.

The diaphragm can be made of any compliant material although one which is chemically insensitive to the hydraulic liquid must be chosen. Neoprene is a good material for this purpose. The diaphragm approximately 1/16 inch thick, is adequate for the construction of the diaphragm.

While the invention has been described with a certain degree of particularity it is manifest that many changes may be made in the details of construction and the arrangement of components. It is understood that the invention is not to be limited to the specific embodiments set forth herein by way of exemplifying the invention but the invention is to be limited only by the scope of the attached claim or claims, including the full range of equivalency to which each element or step thereof is entitled.

What is claimed is:

1. A device for insertion between an upwardly and downwardly extending line for measuring the tensile load comprising:
   a plate having a hydraulic fluid filled cavity in the upper surface thereof and a conduit opening communicating with the cavity;
   a diaphragm sealably covering said cavity;
   a cylindrical piston, the lower surface of which engages said diaphragm, the piston having an axially positioned spherical recess in the upper surface thereof;
   an upper line receiving means for securing an upwardly extending line thereto, said upper line receiving means being secured to said plate;
   a yoke member having an upper horizontal portion extending above said piston, said yoke member being movable relative to said plate, the yoke member horizontal portion having a recess in the lower surface thereof in vertical alignment with said spherical recess in said piston;
   a lower line receiving means adaptable to receive a downwardly extending line, the lower line receiving means being attached to said yoke member;
   a ball positioned in said recess in said yoke member horizontal portion and said cylindrical spherical recess in said piston, the tensile force applied by said lower line receiving means being applied by said ball against said piston; and
   a hydraulic pressure actuated indicating instrument supported to said plate and having communication with said conduit, the instrument being calibrated to reflect the tensile load applied between said upper and lower line receiving means.

2. A device for insertion between an upwardly and downwardly extending line for measuring the tensile load according to claim 1 wherein said plate includes:
   an upper plate portion having a cylindrical opening therein slidably receiving said piston; and
   a lower plate portion having said fluid filled cavity in the upper surface thereof in register with said upper plate cylindrical opening and having said conduit opening therein, the peripheral surfaces of said diaphragm being sealably clamped between said upper and lower plate portions.

3. A device for insertion between an upwardly and downwardly extending line for measuring the tensile load according to claim 2 including a ring cavity in the upper surface of said lower plate portion concentric with and surrounding said cavity and wherein said diaphragm is of circular contour and has an O-ring cross-section at its circumference sealably received in ring cavity.

4. A device for insertion between an upwardly and downwardly extending line for measuring the tensile load according to claim 1 wherein said yoke member upper horizontal portion recess is in the form of a threaded opening and including a threaded screw received in said threaded opening, the lower end of the screw engaging said ball.

5. A device for insertion between an upwardly and downwardly extending line for measuring the tensile load according to claim 1 wherein said indicating instrument includes a Bourdon tube pressure indicating means having communication with said conduit in said plate.

6. A device for insertion between an upwardly and downwardly extending line for measuring the tensile load according to claim 5 including a fluid flow restriction means in said conduit to isolate said Bourdon tube from transient pressure peaks.

* * * * *